June 5, 1951  D. C. GIRARD  2,555,481
ALTERNATING CURRENT ARC WELDING SYSTEM
Filed Oct. 22, 1949
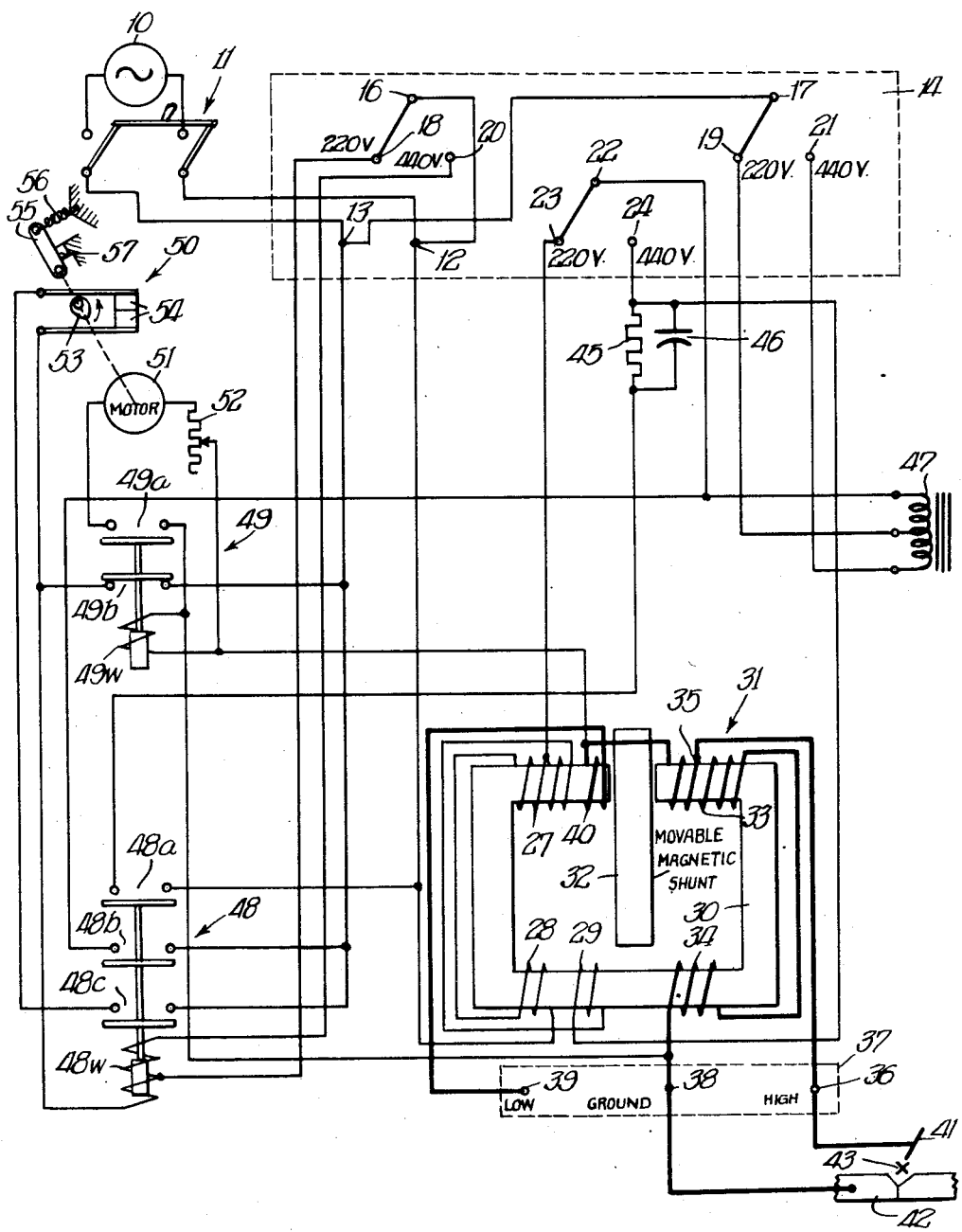
INVENTOR.
Dean C. Girard.
BY
Robert R. Lockwood
atty Patented June 5, 1951

2,555,481

UNITED STATES PATENT OFFICE 2,555,481

ALTERNATING CURRENT ARC WELDING SYSTEM

Dean C. Girard, San Leandro, Calif., assignor, by mesne assignments, to National Cylinder Gas Company, a corporation of Delaware Application October 22, 1949, Serial No. 123,050

10 Claims. (Cl. 315—279)

This invention relates, generally, to alternating current arc welding systems and it has particular relation to such systems wherein the voltage across the welding circuit is maintained at a relatively high value for a predetermined time after the welding operation ceases.

Among the objects of this invention are: To maintain a relatively high voltage across a welding circuit energized from the secondary winding of a welding transformer for a predetermined time after the welding operation ceases and the welding circuit is opened; to reduce the open circuit voltage of the secondary winding only after a predetermined time has elapsed after cessation of the welding operation; to start a time delay device in operation on increase in the voltage across the welding circuit to a predetermined value and arrange the same to connect the primary winding of the welding transformer for energization through an impedance device at the end of the period for which it is set to operate; to employ a motor driven time delay device; and to provide for adjusting the time required for the time delay device to perform its timing function.

Other objects of this invention will, in part, be obvious and in part appear hereinafter.

This invention is disclosed in the embodiment thereof shown in the accompanying drawing and it comprises the features of construction, combination of elements, circuit connections, and arrangement of parts which will be indicated in the description set forth hereinafter and the scope of the application of which will be indicated in the appended claims.

For a more complete understanding of the nature and scope of this invention, reference can be had to the following detailed description, taken together with the accompanying drawing in which the single figure illustrates, diagrammatically, the circuit connections which can be employed in practicing this invention.

Referring now to the drawing, it will be observed that the reference character 10 designates a source of alternating current such as a sixty cycle, two hundred and twenty volt source. Provision is made, as will appear hereinafter, for employing a four hundred and forty volt source. It will be understood that these voltages are indicated for illustrative purposes and that, if desired, other voltages can be employed. The source 10 may be connected by a two pole single throw switch 11 to apply the circuit voltage to terminals 12 and 13 which may be mounted on an input terminal board 14 the outline of which is indicated by broken lines. The terminals 12 and 13 are connected to terminals 16 and 17, respectively, on the input terminal board 14 and these terminals are connected by jumpers to additional terminals 18 and 19 for the two hundred and twenty volt connection. When the source 10 operates at a voltage of four hundred and forty volts, the terminals 16 and 17 can be connected by suitable jumpers to the terminals 20 and 21 on the input terminal board 14. The present invention will be described on the assumption that the two hundred and twenty volt connections are employed. In addition, the input terminal board 14 is provided with terminals 22, 23, and 24 which are employed to shift the connections to primary windings 27, 28 and 29 which are located on a core 30 of a welding transformer which is indicated, generally, at 31 and which may be constructed as shown in Patent No. 2,248,070 issued July 8, 1941, to Herman J. Fanger. As indicated, for the two hundred and twenty volt energization, terminals 22 and 23 are connected by a jumper. For the four hundred and forty volt energization the terminals 22 and 24 are interconnected by a suitable jumper.

The transformer 31 has a movable magnetic shunt 32 which is employed for changing the induction between the primary windings 27, 28 and 29 and secondary windings 33 and 34 which, as shown, are located on the core 30. The secondary winding 33 is provided with a tap 35 which is connected to a high current terminal 36 on an output terminal board 37 which is indicated by broken lines. A ground terminal 38 is provided on the output terminal board 37 and also there is provided a low current terminal 39. As shown the low current terminal 39 is connected for energization from a secondary winding 40 on the core 30 of the transformer 31. In the drawing the high current terminal 36 is shown as being connected to a welding electrode 41 which is positioned in operative relation with respect to work 42 for maintaining an arc 43 therebetween. The work 42 is connected to the ground terminal 38. Where a low welding current is to be used the welding electrode 41 is connected to the low current terminal 39.

With a view to correcting the power factor of the system a resistor 45 and a capacitor 46 are provided. They are connected across the primary windings 27, 28 and 29 in series for accomplishing the power factor correction in a manner to be described.

An impedance device, such as a voltage reducing reactor 47, is employed for connection in series with the primary windings 27, 28 and 29 and across the energizing circuit represented by the terminals 12 and 13. The reactor 47 is provided for reducing the open circuit voltage across the welding circuit to about half the open circuit voltage which is present when the reactor 47 is not connected in the circuit.

The open circuit secondary voltage of the transformer 31 may be of the order of from eighty to one hundred volts. By means of the voltage reducing reactor 47 connected in series with the primary windings 27, 28 and 29, this open circuit voltage is reduced to a voltage of the order of forty to fifty volts and thus reduces the hazard to the welding operator which would otherwise be present were the high open circuit voltage maintained after the welding operation ceases. However, it is difficult to strike the welding arc when only this relatively low open circuit voltage is available and this is particularly true when a coated or covered welding electrode is employed since the coating or covering tends to seal over the arcing end of the electrode after the welding arc has been extinguished. Accordingly it is desirable to maintain the relatively high open circuit voltage for a limited interval after the welding operation ceases. Such an interval preferably is of the order of only one or two seconds in order to allow the coating to be punctured before the open circuit voltage is reduced to the low value necessary to avoid the hazard incident to the maintaining of the relatively high open circuit voltage across the welding circuit. It is to the provision of means for delaying the reduction in the high open circuit voltage to the low open circuit voltage for a predetermined time interval after the welding operation ceases that the present invention is particularly directed.

As soon as the switch 11 is closed, the primary windings 27, 28 and 29 are connected through the voltage reducing reactor 47 for energization to the source 10 of alternating current. This circuit will be traced hereinafter. With a view to shunting the voltage reducing reactor 47 and for connecting the resistor 45 and capacitor 46 in operative relation with the primary windings 27, 28 and 29 to correct the power factor, a line contactor, shown generally at 48, is provided. The line contactor 48 has an operating winding 48w and normally open contacts 48a, 48b, and 48c. The contacts 48a are connected in series with the resistor 45 and capacitor 46 while the contacts 48b are connected in shunt with the voltage reducing reactor 47. Contacts 48c are connected in a holding circuit for the operating winding 48w.

In order to provide a response to the voltage across the welding circuit a control relay, shown generally at 49, is employed. The control relay 49 has an operating winding 49w which is connected for energization across the secondary windings 33 and 34 in series. Also the control relay 49 has normally open contacts 49a and normally closed contacts 49b. The normally closed contacts 49b are connected in series with the operating winding 48w and serve to complete the initial energizing circuit therefor. Contacts 49a control the operation of a time delay device which is indicated, generally, at 50.

The time delay device 50 includes a motor 51 the speed of which can be controlled by a variable resistor 52. The motor 51 is arranged to drive a cam 53 that cooperates with a set of normally closed contacts 54 and serves to open them at the expiration of a predetermined interval. If desired the position of the cam 53 can be varied to change the time after energization of the motor 51 at which the contacts 54 are opened. In such case the motor 51 can be a synchronous motor and thus operate at a fixed speed. The contacts 54 are connected in series with the contacts 48c in the holding circuit for the operating winding 48w. It will be noted that the cam 53 is mounted on a shaft with an arm 55 which is biased by a coil tension spring 56 against a stop 57. The spring 56 restores the cam 53 to its initial position from which it is operated to open the normally closed contacts 54 at the expiration of the predetermined interval during which the high open circuit voltage is maintained across the welding circuit.

In describing the operation of the system shown in the drawing it will be assumed that the two hundred and twenty volt connections are employed and that the welding electrode 41 is out of contact engagement with the work 42 and that there is no arc 43 therebetween. On closure of the switch 11 the primary windings 27 and 28 are energized in series with a portion of the voltage reducing reactor 47. This energizing circuit may be traced from the terminal 12 through primary winding 28, a portion of primary winding 27, terminals 23 and 22 interconnected by the jumper, voltage reducing reactor 47, terminals 19 and 17 interconnected by the jumper, to the terminal 13.

A further result of the closure of the switch 11 is to complete the energizing circuit for the operating winding 48w of the line contactor 48. This circuit may be traced from the terminal 12 through terminals 16 and 18 interconnected by the jumper, the lower portion of the operating winding 48w, contacts 49b of the control relay 49, to the terminal 13.

As a result of the energization of the operating winding 48w over the circuit which has just been traced a circuit is completed at contacts 48a for connecting the resistor 45 and capacitor 46 in parallel with the primary windings 27, 28 and 29 for power factor correcting purposes. At contacts 48b the portion of the voltage reducing reactor 47 connected in series with the primary windings 27 and 28 is shunted and full open circuit voltage is applied across the welding circuit between the terminals 36 and 38. At contacts 48c a holding circuit is completed through contacts 54 around the contacts 49b of the control relay 49 so that, on its subsequent operation, the energizing circuit for the operating winding 48w is maintained.

As a result of the application of full open circuit voltage across the welding circuit, sufficient voltage is applied to the operating winding 49w of the control relay 49 which is connected across the secondary windings 33 and 34 to cause this relay to pull. Its contacts 49b are opened but the circuit for energizing the operating winding 48w is maintained through contacts 48c as described above.

Another result of the pulling of control relay 49 is the closure of contacts 49a which complete the energizing circuit for the motor 51 to a current source which in this case comprises the secondary windings 33 and 34. The timing motor 51 starts to operate and rotates the cam 53 so that after a predetermined interval the contacts 54 are opened. Thereupon the holding circuit for the operating winding 48w of the line contactor 48 is opened and this contactor drops. Contacts 48a are opened to disconnect the resistor 45 and capacitor 46 from the circuit. Contacts 48b are opened and the voltage reducing reactor 47 is connected in series circuit relation with the primary windings 27 and 28. The arrangement is such that about one half of the normal open circuit voltage now is induced in the secondary windings 33 and 34. However, this voltage is sufficient to maintain the control relay 49 pulled since this relay had been operated to this position previously by energization of its operating winding 49w on application thereto of the full open circuit voltage.

Now it will be assumed that the electrode 41 connected to the high current terminal 36 engages the work 42 and the arc 43 is struck. As a result of the completion of the welding circuit, the voltage thereacross drops to a value which is below that necessary to maintain the control relay 49 pulled. Accordingly, it drops and at contacts 49b the previously traced energizing circuit for the operating winding 48w is completed. Line contactor 48 pulls. The resistor 45 and capacitor 46 are connected in the circuit for power factor correction and the voltage reducing reactor 47 is shunted in the manner previously described so that the primary windings 27 and 28 are connected directly for energization between the terminals 12 and 13. Full voltage is then induced in the secondary windings 33 and 34 and the welding operation can proceed under normal conditions.

As long as the welding arc 43 is maintained, the voltage applied to the operating winding 49w of the control relay 49 is not sufficient to pull this relay. However, when the welding operation ceases, as by the withdrawal of the welding electrode 41 from the work 42 sufficiently far so that the arm 43 is not maintained, the voltage across the secondary windings 33 and 34 rises to the full open circuit voltage. Sufficient voltage is applied to the operating winding 49w of the control relay 49 so that it pulls. Its contacts 49a are closed and the motor 51 of the time delay device 50 is energized. At the expiration of the predetermined time interval for which the time delay device 50 is set, contacts 54 are opened and the energizing circuit for the operating windings 48w of the line contactor 48 is opened. Thereupon the line contactor 48 drops. During this interval full open circuit voltage is maintained across the welding circuit and the restriking of the arc 43 is thereby facilitated. Upon the dropping of the line contactor 48 the resistor 45 and capacitor 46 are disconnected and the shunt around the voltage reducing reactor 47 is removed. Thereupon the low open circuit voltage condition is maintained across the welding circuit.

If the welding arc 43 is restruck during the interval before the contacts 54 are opened by the motor 51, the voltage across the operating winding 49w of the control relay 49 is again reduced to such a value that its contacts 49a are opened. The motor 51 is deenergized and the spring 56 restores the cam 53 to its initial operating position.

Since certain changes can be made in the foregoing construction and system and different embodiments of the invention can be made without departing from the spirit and scope thereof, it is intended that all matter shown in the accompanying drawing and described hereinbefore shall be interpreted as illustrative and not in a limiting sense.

What is claimed is new is:

1. In an alternating current arc welding system wherein a transformer is provided with a primary winding connected to be variably energized from an alternating current source and a secondary winding connected to energize a welding circuit, in combination, a line contactor for variably connecting said primary winding to said source whereby a relatively high or a relatively low open circuit voltage is induced in said secondary winding; a control relay for said line contactor connected to be responsive to said induced voltage and adapted to pick up on application of said relatively high open circuit voltage, to remain picked up on application of said relatively low open circuit voltage, and to drop out on completion of said welding circuit and to remain dropped out during the maintenance of a welding arc thereacross; and a time delay device connected to be responsive to the picking up of said control relay after the welding operation ceases and to operate said line contactor a predetermined time thereafter to change the connections to said primary winding so that the welding circuit thereafter is energized with said low open circuit voltage.

2. In an alternating current arc welding system wherein a transformer is provided with a primary winding connected to be variably energized from an alternating current source and a secondary winding connected to energize a welding circuit, in combination, a line contactor for variably connecting said primary winding to said source whereby a relatively high or a relatively low open circuit voltage is induced in said secondary winding when said line contactor is pulled or dropped respectively; a control relay for said line contactor connected to be responsive to said induced voltage and adapted to pick up on application of said relatively high open circuit voltage, to remain picked up on application of said relatively low open circuit voltage, and to drop out on completion of said welding circuit and to remain dropped out during the maintenance of a welding arc thereacross; and a time delay device connected to be responsive to the picking up of said control relay after the welding operation ceases and to cause said line contactor to drop a predetermined time thereafter to change the connections to said primary winding so that the welding circuit thereafter is energized with said low open circuit voltage.

3. In an alternating current arc welding system wherein a transformer is provided with a primary winding connected to be energized from an alternating current source through an impedance device and a secondary winding connected to energize a welding circuit, in combination, a line contactor for shunting said impedance device and connecting said primary winding for energization directly to said source whereby a relatively high open circuit voltage is induced in said secondary winding; a control relay for said line contactor connected to be responsive to said induced voltage and adapted to pick up on application of said relatively high open circuit voltage, to remain picked up on application of relatively low open circuit voltage when said impedance device is not shunted, and to drop out on completion of said welding circuit and to remain dropped out during the maintenance of a welding arc thereacross; and a time delay device connected to be responsive to the picking up of said control relay after the welding operation ceases and to operate said line contactor a predetermined time thereafter to remove the shunt around said impedance device whereby said primary winding is energized therethrough and said welding circuit thereafter is energized with said low open circuit voltage.

4. In an alternating current arc welding system wherein a transformer is provided with a primary winding connected to be energized from an alternating current source through an impedance device and a secondary winding connected to energize a welding circuit, in combination, a line contactor for shunting said impedance device and connecting said primary winding for energization directly to said source whereby a relatively high open circuit voltage is induced in said secondary winding or for connecting said primary winding through said impedance device to said source whereby a relatively low open circuit voltage is induced in said secondary winding when said line contactor is pulled or dropped respectively; a control relay for said line contactor connected to be responsive to said induced voltage and adapted to pick up on application of said relatively high open circuit voltage, to remain picked up on application of said relatively low open circuit voltage when said impedance device is not shunted, and to drop out on completion of said welding circuit and to remain dropped out during the maintenance of a welding arc thereacross; and a time delay device connected to be responsive to the picking up of said control relay after the welding operation ceases and to operate said line contactor a predetermined time thereafter to remove the shunt around said impedance device whereby said primary winding is energized therethrough and said welding circuit thereafter is energized with said low open circuit voltage.

5. In an alternating current arc welding system wherein a transformer is provided with a primary winding connected to be variably energized from an alternating current source and a secondary winding connected to energize a welding circuit, in combination, a line contactor for variably connecting said primary winding to said source whereby a relatively high or a relatively low open circuit voltage is induced in said secondary winding; a control relay for said line contactor connected to be responsive to said induced voltage and adapted to pick up on application of said relatively high open circuit voltage, to remain picked up on application of said relatively low open circuit voltage, and to drop out on completion of said welding circuit and to remain dropped out during the maintenance of a welding arc thereacross; and a time delay device connected for energization to said secondary winding in response to the picking up of said control relay after the welding operation ceases and to operate said line contactor a predetermined time thereafter to change the connections to said primary winding so that the welding circuit thereafter is energized with said low open circuit voltage.

6. In an alternating current arc welding system wherein a welding transformer is provided with a primary winding connected to be variably energized from an alternating current source and a secondary winding connected to energize a welding circuit, in combination; a control relay having an operating winding connected for energization to said secondary winding, a set of normally closed contacts, and a set of normally open contacts, said operating winding being adapted to open said normally closed contacts and close said normally open contacts when said primary winding is energized and a relatively high open circuit voltage is induced into said secondary winding, to hold said contacts open and closed as aforesaid on reduction of said open circuit voltage through a substantial amount, and to release said contacts to move to their normal positions on completion of said welding circuit and maintenance of a welding arc thereacross; a line contactor having an operating winding connected for energization through said normally closed contacts of said control relay and two sets of normally open contacts, one set being adapted to variably connect said primary winding to said source and the other set being connected in series with said operating winding of said line contactor to provide a holding circuit therefor; a time delay device connected for energization through said normally open contacts of said control relay, and a set of normally closed contacts connected in series in said holding circuit for said operating winding of said line contactor and adapted to be opened by said time delay device a predetermined time after the same is energized and to be closed on deenergization thereof.

7. In an alternating current arc welding system wherein a welding transformer is provided with a primary winding connected to be variably energized from an alternating current source and a secondary winding connected to energize a welding circuit, in combination; a control relay having an operating winding connected for energization to said secondary winding, a set of normally closed contacts, and a set of normally open contacts, said operating winding being adapted to open said normally closed contacts and close said normally open contacts when said primary winding is energized and a relatively high open circuit voltage is induced into said secondary winding, to hold said contacts open and closed as aforesaid on reduction of said open circuit voltage through a substantial amount, and to release said contacts to move to their normal positions on completion of said welding circuit and maintenance of a welding arc thereacross; a line contactor having an operating winding connected for energization through said normally closed contacts of said control relay and two sets of normally open contacts, one set being adapted to variably connect said primary winding to said source and the other set being connected in series with said operating winding of said line contactor to provide a holding circuit therefor; and a time delay device including a timing motor connected for energization through said normally open contacts of said control relay, and a set of normally closed contacts connected in series in said holding circuit for said operating winding of said line contactor and operatively connected to said motor and adapted to be opened a predetermined time after the same is energized and to be closed on deenergization thereof.

8. In an alternating current arc welding system wherein a welding transformer is provided with a primary winding connected to be energized from an alternating current source through an impedance device and a secondary winding connected to energize a welding circuit, in combination; a control relay having an operating winding connected for energization to said secondary winding, a set of normally closed contacts, and a set of normally open contacts, said operating winding being adapted to open said normally closed contacts and close said normally open contacts when said primary winding is energized directly from said source and a relatively high open circuit voltage is induced into said secondary winding, to hold said contacts open and closed as aforesaid on reduction of said open circuit voltage by energization of said primary winding through said impedance device, and to release said contacts to move to their normal positions on completion of said welding circuit and maintenance of a welding arc thereacross; a line contactor having an operating winding connected for energization through said normally closed contacts of said control relay and two sets of normally open contacts, one set being connected to shunt said impedance device and the other set being connected in series with said operating winding of said line contactor to provide a holding circuit therefor; and a time delay device including a timing motor connected for energization through said normally open contacts of said control relay, and a set of normally closed contacts connected in series in said holding circuit for said operating winding of said line contactor and operatively connected to said motor and adapted to be opened a predetermined time after the same is energized and to be closed on deenergization thereof.

9. In an alternating current arc welding system wherein a welding transformer is provided with a primary winding connected to be energized from an alternating current source through an impedance device and a secondary winding connected to energize a welding circuit, in combination; a control relay having an operating winding connected for energization to said secondary winding, a set of normally closed contacts, and a set of normally open contacts, said operating winding being adapted to open said normally closed contacts and close said normally open contacts when said primary winding is energized directly from said source and a relatively high open circuit voltage is induced into said secondary winding, to hold said contacts open and closed as aforesaid on reduction of said open circuit voltage by energization of said primary winding through said impedance device, and to release said contacts to move to their normal positions on completion of said welding circuit and maintenance of a welding arc thereacross; a line contactor having an operating winding connected for energization to said source through said normally closed contacts of said control relay and two sets of normally open contacts, one set being connected to shunt said impedance device and the other set being connected in series with said operating winding of said line contactor to provide a holding circuit therefor; and a time delay device including a timing motor connected for energization through said normally open contacts of said control relay to said secondary winding, and a set of normally closed contacts connected in series in said holding circuit for said operating winding of said line contactor and operatively connected to said motor and adapted to be opened a predetermined time after the same is energized and to be closed on deenergization thereof.

10. In an alternating current arc welding system wherein a welding transformer is provided with a primary winding connected to be energized from an alternating current source through an impedance device and a secondary winding connected to energize a welding circuit, in combination; a controy relay having an operating winding connected for energization to said secondary winding, a set of normally closed contacts, and a set of normally open contacts, said operating winding being adapted to open said normally closed contacts and close said normally open contacts when said primary winding is energized directly from said source and a relatively high open circuit voltage is induced into said secondary winding, to hold said contacts open and closed as aforesaid on reduction of said open circuit voltage by energization of said primary winding through said impedance device, and to release said contacts to move to their normal positions on completion of said welding circuit and maintenance of a welding arc thereacross; a line contactor having an operating winding connected for energization to said source through said normally closed contacts of said control relay and two sets of normally open contacts, one set being connected to shunt said impedance device and the other set being connected in series with said operating winding of said line contactor to provide a holding circuit therefor; and a time delay device including a timing motor connected for energization through said normally open contacts of said control relay to said secondary winding, a variable resistor connected in series with said motor for changing its period of operation, and a net of normally closed contacts connected in series in said holding circuit for said operating winding of said line contactor and operatively connected to said motor and adapted to be opened a predetermined time after the same is energized and to be closed on deenergization thereof.

DEAN C. GIRARD.

REFERENCES CITED

The following references are of record in the file of this patent:

UNITED STATES PATENTS

| Number | Name | Date |
|---|---|---|
| 1,343,207 | Eschholz | June 15, 1920 |
| 2,078,690 | Schueler | Apr. 27, 1937 |
| 2,376,215 | Welch Jr. | May 15, 1945 |
| 2,444,168 | Mulder | June 29, 1948 |